Patented May 11, 1926.

1,584,219

UNITED STATES PATENT OFFICE.

JOHN DE MAY, OF DETROIT, MICHIGAN, ASSIGNOR TO PACKARD MOTOR CAR COMPANY, OF DETROIT, MICHIGAN, A CORPORATION OF MICHIGAN.

ALUMINUM SOLDER.

No Drawing.   Application filed February 26, 1919. Serial No. 279,392.

This invention relates to aluminum solders and processes of producing the same.

The object of the invention is to provide a solder suitable for use in connection with aluminum parts and capable of being more easily applied to and retained upon the surface to be soldered during the soldering operation, which shall provide a stronger joint than aluminum solders heretofore employed and which shall fuse readily, alloy easily with the metal, retain its color and which may be produced and used at relatively slight cost.

With these objects and others in view, the invention is embodied in the composition and in the method hereinafter described.

The preferable composition of the improved solder is substantially as follows:—aluminum, 9.5%; zinc, 20%; tin, 68%; antimony, 2.5%.

In this alloy, the relatively large quantity of tin, and to some extent, the zinc, have the property of rendering a flux unnecessary. An aluminum surface, no matter how carefully cleaned, has a thin invisible skin of alumina. By providing a solder in which a flux is unnecessary, the soldering action will be instantaneous, and the solder readily alloys with the metal of the parts to be joined and produces an alloyed structure that is strong and tough. As aluminum is a high electro-positive element there is a galvanic action between the solder and the metal. By the use of the zinc and tin, the former of which is near to aluminum in the galvanic series, this action is reduced to a minimum.

The preferred method of producing the solder is as follows:

The foregoing quantity of tin is first melted and then the temperature thereof increased to 1100° F. The zinc is then added and following such addition the temperature is increased to substantially 1065° F. Then the aluminum is added and the heat maintained until said material is melted which will occur at a temperature of substantially 1096° F. or 1100° F. The heat is then increased to substantially 1126° F. The antimony is then melted in a separate receptacle from that containing the mixture, and added thereto and during such addition the temperature of the batch is raised to substantially 1186° F., the batch being constantly stirred to insure an intimate mixture of the metals. The alloy is then poured at a temperature of about 1186° F.

If desired, the aluminum, zinc and tin may all be mixed and melted together at the same time, and then the antimony separately melted and added to the above mixture. However, the separate meltings and successive additions of the various metals is considered the preferable method.

A gas furnace and a cast iron pot may be used in carrying out the foregoing process.

A solder of the above composition and produced according to the foregoing method has been found to be stronger than aluminum solders heretofore employed and to be capable of more ready application to the parts to be joined owing to the fact that it remains in a somewhat pasty condition and is much less fluid than the ordinary solder, with the result that it does not run off the surface to which it is applied so easily and hence the welding operation may be carried through more quickly and with much less loss of material than is usual.

Having thus described my invention, what I claim and desire to secure by Letters Patent is:—

1. A metal alloy including tin as the predominant metal, the same being in excess of fifty percent of the alloy, a relatively large percentage of zinc, and substantial amounts of aluminum and antimony.

2. An aluminum solder comprising the following metals in substantially the proportions named:—aluminum about 9.5%; zinc about 20%; tin about 68%; and antimony about 2.5%.

3. The method of forming an aluminum solder which consists in first forming a batch of melted aluminum, zinc and tin, separately melting antimony and adding it to the above mixture.

4. The method of forming an aluminum solder which consists in first melting a quantity of tin, then adding zinc, then adding aluminum and maintaining the heat of the mixture until the aluminum is melted, and melting a quantity of antimony in a separate receptacle and adding the same to the mixture.

5. The method of forming an aluminum solder which comprises melting tin and heating the same to a temperature of approximately 1100° F.; adding zinc and heating the mixture to a temperature of approximately 1065° F.; adding aluminum and maintaining the heat until the aluminum melts and then increasing the temperature to approximately 1125° F.; melting antimony in a separate vessel and adding the same to the mixture and then increasing the temperature of the mixture to approximately 1185° F.

6. The method of forming an aluminum solder which consists in melting a quantity of tin substantially equal to 68% of the total alloy to be made and heating the same to about 1100° F., then adding zinc to an amount substantially equal to 20% of said total and heating the mixture to approximately 1065° F., then adding substantially 9.5% aluminum and maintaining the temperature until the aluminum is melted, and increasing the heat to approximately 1126° F., then separately melting antimony to an amount equal to substantially 2.5% of the total and adding the melted antimony to the mixture and increasing the heat to approximately 1186° F., stirring constantly during the process to insure an intimate mixture of the metals, and pouring the alloy at a temperature of about 1186° F.

7. An aluminum alloy composed of tin, zinc, aluminum and antimony, containing about seventy percent tin and about twenty percent zinc; the remainder containing about three times as much aluminum as antimony.

8. An aluminum alloy composed of tin, zinc, aluminum and antimony; there being over one-half tin, over one-quarter zinc, over one-tenth aluminum, and a substantial amount of antimony.

In testimony whereof I affix my signature.

JOHN DE MAY.